Patented May 31, 1949

2,471,463

12 Claims. (Cl. 260—30.6)

1

This invention relates to plasticizing agents, and more particularly to alkyl phenylphosphonates having at least 4 carbon atoms in the alkyl group and a boiling point at 3 mm. absolute pressure not substantially below 160° C.

This application is a continuation-in-part of my copending application Serial No. 517,765, filed January 10, 1944, now matured as U. S. Patent No. 2,400,577 in which I described a method of preparing dialkyl esters of phenylphosphonic acid. Certain of these esters have very good properties as plasticizing agents, particularly for use with synthetic resins such as vinylite, nitrocellulose, and ethyl cellulose. For this purpose the alkyl group should contain at least 4 carbon atoms, and preferably does not contain more than 8 carbon atoms. Esters containing less than 4 carbon atoms in the alkyl group have boiling points which are too low for satisfactory use, it being preferred that the boiling point be not substantially below 160° C. at 3 mm. absolute pressure.

The method of preparing these esters is described fully in my application above referred to, but briefly it consists in reacting phenylphosphorus oxydichloride with alcohols, eliminating the resulting hydrogen chloride and finally obtaining the dialkyl ester product by distillation under vacuum. Inasmuch as it is preferred to obtain the product by such distillation, esters having more than 8 carbon atoms in the alkyl group become increasingly difficult to recover because of the increase in their boiling points.

The following table illustrates some of the properties of esters having from 4 to 8 carbon atoms in the alkyl group:

| | Dibutyl phenylphosphonate | Diamyl phenylphosphonate | Dioctyl phenylphosphonate | Di-i-propyl phenylphosphonate |
|---|---|---|---|---|
| Physical State | Liquid | Liquid | Liquid | Liquid |
| Color | Colorless | Colorless | Colorless | Colorless |
| Freezing point | Viscous at -70° C | Viscous at -70° C | Semi-solid at -70° C | -43° C |
| Boiling point | 160° C (3 mm.) | 178° C (3.5 mm.) | 206-7° C (4 mm.) | 143° C (1 mm.) |
| Specific Gravity (28° C.) | 1.049 | 1.016 | 0.977 | 1.073 |
| Refractive Index (30° C.) | 1.492 | 1.480 | 1.477 | 1.485 |
| Surface Tension (dynes/cm.² at 30° C.) | 34.5 | 35 | 28.3 | 35.8 |
| Viscosity (centipoises 30° C.) | 9.1 | 13 | 27.0 | 34.1 |
| Flash point (open cup) (° F.) | 305 | 380 | 370 | 255 |
| Fire point (open cup) (° F.) | 340 | 350 | 395 | 270 |
| Evaporation rate (grams per sq. cm. after 100 hr. at 100° C.) | 0.50 | 0.042 | 0.031 | [illegible] |
| Hydrolysis (0.1 gram refluxed 24 hr. with 100 cc. $H_2O$ at 100° C.) (titrated with N/10 NaOH) | 0.1 cc. | 0.2 cc. | 0.1 cc. | 22 cc. |
| Solubility in water (g./liter) | 0.38 | 0.065 | 0.05 | 22.1 |

2

Column 4 gives the properties of di-i-propyl phenylphosphonate for the purpose of comparison, the latter product being deemed not suitable as a plasticizer.

The preferred plasticizer is the dioctyl phenylphosphonate which has an extremely low evaporation rate, as well as low solubility in water. This ester is prepared as shown in the parent application, now U. S. Patent No. 2,400,577 by the method which consists of reacting phenylphosphorus oxydichloride with 2-ethyl hexanol (octyl alcohol) to give a 93.5% yield of di(2-ethyl-hexyl) phenylphosphonate having a boiling point of 206-207° C. at 4 mm. of Hg pressure. The material has a specific gravity of 0.977 at 28° C., and an index of refraction of about 1.477 at 30° C.

The products are particularly suitable for plasticizing vinylite resins. For example, dioctyl phenylphosphonate was employed with a vinyl resin produced by reaction of vinyl chloride and vinyl acetate in the ratio of 95 parts vinyl chloride and 5 parts vinyl acetate. Dioctyl phenylphosphonate was used in the proportion of 30, 35 and 40% by weight of the total which included negligible proportions of lubricant and stabilizer (less than 1%). In all of these proportions the dioctyl phenylphosphonate produces good elongation characteristics, low volatility or loss of plasticizer in air and water, good heat stability against discoloration at 160° C., and excellent low temperature flexibility. There was no evidence of sweating out (surface oiliness).

The following table shows the results of such tests and of a fourth test in which 33.3% of a

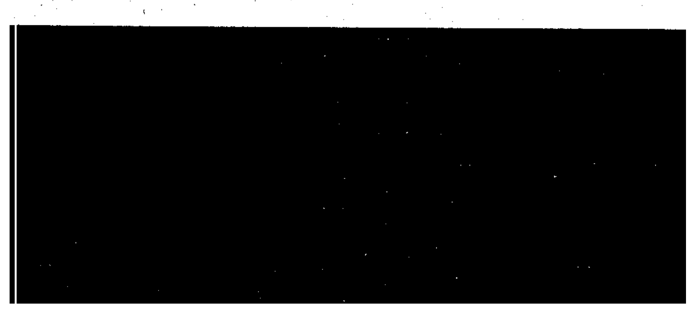

plasticizer was employed in order to give an elongation of 100 at 25° C.:

| Plasticizer | Per Cent by Weight | Vinylite Resin, Per Cent by Weight | Per Cent Elongation | | | Per Cent Loss in 10 days from .004 in. film | | | Heat Stability (hr. at 160° C.) | Flex Temperature (° C.) | Sweat-out |
|---|---|---|---|---|---|---|---|---|---|---|---|
| | | | 10° C. | 25° C. | 40° C. | Air 60° C. | Water 25° C. | Oil 25° C. | | | |
| Dioctyl phenylphosphonate | 30 | 70 | 40 | 85 | 140 | 1.2 | −0.2 | 9.7 | 4 | −36.0 | No |
| | 35 | 65 | 75 | 130 | 180 | 1.1 | −0.1 | 16.6 | 4 | −43.0 | No |
| | 40 | 60 | 120 | 175 | 265 | 1.2 | −0.1 | 21.7 | 4 | −50.0 | No |
| | 31.8 | 68.2 | 51 | 100 | 150 | 1.2 | −0.1 | 12.0 | 4 | −38.5 | No |

The test procedures are described in Ind. Eng. Chem. 35, p. 896 (1943).

In other tests plastic films were made by dissolving the plasticizers and various resins in suitable solvents, casting into sheets and then evaporating the solvents.

The resins employed were vinylite (a copolymer of 95% vinyl chloride and 5% vinyl acetate), nitrocellulose, ethyl cellulose, and cellulose acetate.

The following tables show the results of these tests:

| | Soln. | Film | Spewing | Flammability | Volatility (5 hrs. at 105° C.) |
|---|---|---|---|---|---|
| **1. VINYLITE (20% SOLUTION IN METHYL ETHYL KETONE)** | | | | | |
| Plasticizer (26% by wt. of plastic): | | | | | |
| Dioctyl phenylphosphonate | Clear | Clear | Nil | Does not support flame | 8% of plasticizer. |
| Dibutyl phenylphosphonate | do | do | do | do | 64% of plasticizer. |
| **2. NITROCELLULOSE (20% SOLUTION IN MIXTURE OF METHYL ETHYL KETONE 20%, BUTYL ACETATE 20%, ETHYL ALCOHOL 30%, TOLUOL 30% (BY WT.))** | | | | | |
| Plasticizer (26% by wt. of plastic): | | | | | |
| Dioctyl phenylphosphonate | Clear | Clear | Nil | Flammable | 5% of plasticizer. |
| Dibutyl phenylphosphonate | do | do | do | do | 54% of plasticizer. |
| **3. ETHYL CELLULOSE (20% SOLUTION IN MIXTURE OF 80% BY WEIGHT OF TOLUOL AND 20% BY WEIGHT OF ETHYL ALCOHOL)** | | | | | |
| Plasticizer (20% by wt. of plastic): | | | | | |
| Dioctyl phenylphosphonate | Clear | Clear | Nil | Supports flame | 13% of plasticizer. |
| Dibutyl phenylphosphonate | do | do | do | do | 35% of plasticizer. |
| **4. CELLULOSE ACETATE (20% SOLUTION IN ACETONE)** | | | | | |
| Plasticizer (43% by wt. of plastic): | | | | | |
| Dioctyl phenylphosphonate | Clear | Not compatible | | | |
| Dibutyl phenylphosphonate | do | Clear | Nil | Supports flame | 60% of plasticizer. |

The term vinylite as used in the claims is intended to mean a copolymer of a major proportion of vinyl chloride and a minor amount of vinyl acetate, generally from 80 to 95% vinyl chloride and 20 to 5% vinyl acetate.

The foregoing detailed description has been given for clearness of understanding only, and no unnecessary limitations should be understood therefrom.

What I claim as new, and desire to secure by Letters Patent, is:

1. A plasticizing agent consisting essentially of dialkyl phenylphosphonate containing from 4 to 8 carbon atoms in the alkyl groups.

2. A plasticizing agent consisting essentially of a dialkyl phenylophosphonate containing from 4 to 8 carbon atoms in the alkyl groups and having a boiling point at 3 mm. absolute pressure of not substantially less than 160° C.

3. A composition comprising an organic plastic of the group consisting of a copolymer of a major proportion of vinyl chloride and a minor proportion of vinyl acetate, nitrocellulose, and ethyl cellulose and containing a plasticizing proportion of a dialkyl phenylphosphonate containing from 4 to 8 carbon atoms in the alkyl group.

4. A composition as set forth in claim 3 in which the phenylphosphonate is dioctyl phenylphosphonate.

5. A copolymer of 80 to 95% vinyl chloride and 20 to 5% vinyl acetate plastic composition containing a plasticizing proportion of dioctyl phenylphosphonate.

6. A nitrocellulose plastic composition containing a plasticizing proportion of dioctyl phenylphosphonate.

7. An ethyl cellulose plastic composition containing a plasticizing proportion of dioctyl phenylphosphonate.

8. A composition as set forth in claim 3 in which the alkyl groups are butyl.

9. A composition as set forth in claim 3 in which the alkyl groups are octyl.

10. A composition as set forth in claim 3 in which the alkyl groups are amyl.

11. Dioctyl phenylphosphonate.

12. A composition comprising a copolymer of 80 to 95% vinyl chloride and 20 to 5% vinyl acetate and containing a plasticizing proportion of a dialkyl phenylphosphonate containing from 4 to 8 carbon atoms in the alkyl groups.

ARTHUR DOCK FON TOY.

REFERENCES CITED

The following references are of record in the file of this patent:

UNITED STATES PATENTS

| Number | Name | Date |
|---|---|---|
| 2,151,380 | Flint et al. | Mar. 21, 1939 |

OTHER REFERENCES

Michaelis, Ber. Deut. Chem. Ges. 181 (1876), pages 335, 336, 337 and 338.